US011055650B2

(12) United States Patent
Patin et al.

(10) Patent No.: US 11,055,650 B2
(45) Date of Patent: Jul. 6, 2021

(54) EXECUTION SYSTEMS USING UNSTRUCTURED DATA

(71) Applicant: LOGISTIVIEW, INC., Cary, NC (US)

(72) Inventors: Seth Robert Patin, Raleigh, NC (US); David Brian Koch Erickson, Chanhassen, MN (US); Raymond Pasquale Spagnola, Fuquay-Varina, NC (US); Amin Fetanat Fard Haghighi, Holly Springs, NC (US); Paul Michael Patin, Raleigh, NC (US)

(73) Assignee: LOGISTIVIEW, INC., Cary, NC (US)

( * ) Notice: Subject to any disclaimer, the term of this patent is extended or adjusted under 35 U.S.C. 154(b) by 173 days.

(21) Appl. No.: 15/906,929

(22) Filed: Feb. 27, 2018

(65) Prior Publication Data

US 2019/0266525 A1 Aug. 29, 2019

(51) Int. Cl.
*G06Q 10/06* (2012.01)
*G06F 16/30* (2019.01)
*G06K 9/00* (2006.01)

(52) U.S. Cl.
CPC ......... *G06Q 10/0633* (2013.01); *G06F 16/30* (2019.01); *G06K 9/00442* (2013.01)

(58) Field of Classification Search
CPC . G06Q 10/0633; G06F 16/30; G06K 9/00442
See application file for complete search history.

(56) References Cited

U.S. PATENT DOCUMENTS

| 5,978,836 A | * | 11/1999 | Ouchi | G06Q 10/10 709/203 |
| 6,505,219 B1 | * | 1/2003 | MacLean | G06Q 10/10 715/205 |

(Continued)

FOREIGN PATENT DOCUMENTS

KR 10-0582917 B1 5/2006

OTHER PUBLICATIONS

Perez et al. "Collection and Processing of Data from Wrist Wearable Devices in Heterogenous and Multiple-User Scenarios" (Jun. 2016) (Year: 2016).*

(Continued)

*Primary Examiner* — Sujay Koneru
(74) *Attorney, Agent, or Firm* — Artegis Law Group, LLP (57) ABSTRACT

Execution systems using unstructured data include a memory, one or more input/output devices, and one or more processors coupled to the memory and the input/output devices. The one or more processors are configured to receive a working document comprising data, receive a workflow described according to a workflow structure, the workflow structure describing sub-processes of the workflow, routings between the sub-processes, actions that make up the sub-processes, and mappings between the data in the working document and the actions, identify a first sub-process to be performed, perform each of one or more first actions associated with the first sub-process, update the data in the working document based on one or more first mappings associated with the one or more first actions, and select a second sub-process to be performed based on the data in the working document and one or more first routings associated with the first sub-process.

11 Claims, 7 Drawing Sheets

(56) References Cited

U.S. PATENT DOCUMENTS

| | | | | |
|---|---|---|---|---|
| 7,020,618 B1* | 3/2006 | Ward | G06Q 10/06311 | 705/2 |
| 7,403,948 B2* | 7/2008 | Ghoneimy | G06Q 99/00 | 707/792 |
| 2003/0208743 A1* | 11/2003 | Chong | G06F 8/10 | 717/106 |
| 2004/0078105 A1* | 4/2004 | Moon | G06Q 10/10 | 700/100 |
| 2007/0011334 A1 | 1/2007 | Higgins et al. | | |
| 2010/0064357 A1* | 3/2010 | Baird | G06F 8/30 | 726/6 |
| 2010/0223557 A1* | 9/2010 | Kenney | G06Q 10/10 | 715/736 |
| 2011/0173153 A1* | 7/2011 | Domashchenko | G06F 16/86 | 707/608 |
| 2011/0239126 A1* | 9/2011 | Erickson, Jr. | H04N 21/2225 | 715/744 |
| 2013/0123964 A1* | 5/2013 | Cooper | G05B 13/00 | 700/97 |
| 2013/0139164 A1* | 5/2013 | Balko | G06F 8/35 | 718/102 |
| 2015/0073907 A1* | 3/2015 | Purves | G06Q 20/384 | 705/14.58 |
| 2015/0220778 A1* | 8/2015 | Macciola | G06K 9/2018 | 382/112 |
| 2015/0262105 A1* | 9/2015 | Jeffries | G06Q 10/06316 | 705/7.26 |
| 2015/0264180 A1* | 9/2015 | Wolthuis | H04M 3/5233 | 379/265.12 |
| 2016/0094483 A1 | 3/2016 | Johnston et al. | | |
| 2016/0292373 A1* | 10/2016 | Spors | G16H 40/63 | |
| 2016/0292374 A1* | 10/2016 | Hutchins | G16H 50/30 | |
| 2017/0147290 A1* | 5/2017 | Kumar | G06F 8/36 | |
| 2017/0185444 A1 | 6/2017 | Tenczar et al. | | |
| 2017/0315789 A1* | 11/2017 | Lam | G06Q 10/067 | |
| 2017/0316363 A1* | 11/2017 | Siciliano | G06Q 10/10 | |
| 2018/0080774 A1* | 3/2018 | Sink | G06T 19/003 | |
| 2018/0293533 A1* | 10/2018 | Lowry | G06Q 10/06 | |
| 2018/0308024 A1* | 10/2018 | Kilner | H04N 21/47217 | |
| 2019/0266525 A1* | 8/2019 | Patin | G06F 16/30 | |

OTHER PUBLICATIONS

International Search Report for application No. PCT/US2019/019772 dated Jun. 14, 2019.

* cited by examiner

```
"shippingInfo": {
    "specialHandling": "BubbleWrap,ShrinkWrap,Anti-Static",
    "shippingRequirements": {
        "mode": "GROUND",
        "tempControl": "ambient"
    }
},
"status": "PENDING",
"taskId": "ORD01001",
"items": [
    {
        "activity": "PICK",
        "sequence": 1,
        "status": "PENDING",
        "locationId": "LOC-102",
        "materialId": "WidgetA",
        "quantityRequired": 1
    },
    {
        "activity": "PICK",
        "sequence": 2,
        "status": "PENDING",
        "locationId": "LOC-104",
        "materialId": "WidgetB",
        "quantityRequired": 7
    },
    {
        "activity": "PICK",
        "sequence": 3,
        "status": "PENDING",
        "locationId": "LOC-105",
        "materialId": "WidgetC",
        "quantityRequired": 3
    } ]
}
```

*FIG. 8*

EXECUTION SYSTEMS USING UNSTRUCTURED DATA

TECHNICAL FIELD

The present disclosure relates generally to computing systems, and more particularly to execution systems using unstructured data.

BACKGROUND

The use of computing systems to manage and report workplace sub-process execution is prevalent. While the costs of computing power and data storage continuously trend downward, miniaturization and increased sophistication for mobile computing devices trend upward. Businesses can infuse computing systems into otherwise manual, repetitive processes, with reasonable expectation of return on investment (ROI) thanks to resulting gains in productivity, consistency, and accuracy.

Computing systems which manage and report workplace sub-process executions, often referred to as execution systems; often interact with other systems and data stores which operate on more abstract concepts, such as monetary assets, orders, purchase orders, invoices and bills of sale. Execution systems typically analyze these abstract concepts and high-level goals and, from them, determine a set of real-world sub-processes that satisfy the high-level goals. The sub-processes often include additional details that are usable to instruct a human workforce and/or automation systems to successfully complete the sub-processes and satisfy the high-level goals.

Accordingly, it would be advantageous to have improved execution systems and methods for operating them.

SUMMARY

Consistent with some embodiments, a computing system includes a memory, one or more input/output devices, and one or more processors coupled to the memory and the one or more input/output devices. The one or more processors are configured to receive a working document comprising data, receive a workflow described according to a workflow structure, the workflow structure describing sub-processes of the workflow, routings between the sub-processes, actions that make up the sub-processes, and mappings between the data in the working document and the actions, identify a first sub-process to be performed, perform each of one or more first actions associated with the first sub-process, update the data in the working document based on one or more first mappings associated with the one or more first actions, and select a second sub-process to be performed based on the data in the working document and one or more first routings associated with the first sub-process.

Consistent with some embodiments, a method performed by a workflow engine of a computing device includes receiving a working document comprising data, receiving a workflow described according to a workflow structure, the workflow structure describing sub-processes of the workflow, routings between the sub-processes, actions that make up the sub-processes, and mappings between the data in the working document and the actions, identifying a first sub-process to be performed, performing each of one or more first actions associated with the first sub-process, updating the data in the working document based on one or more first mappings associated with the one or more first actions, and selecting a second sub-process to be performed based on the data in the working document and one or more first routings associated with the first sub-process.

Consistent with some embodiments, a non-transitory machine-readable medium comprising a plurality of machine-readable instructions which when executed by one or more processors associated with a computing device cause the processors to perform a method. The method includes receiving a working document comprising data, receiving a workflow described according to a workflow structure, the workflow structure describing sub-processes of the workflow, routings between the sub-processes, actions that make up the sub-processes, and mappings between the data in the working document and the actions, identifying a first sub-process to be performed, performing each of one or more first actions associated with the first sub-process, updating the data in the working document based on one or more first mappings associated with the one or more first actions, and selecting a second sub-process to be performed based on the data in the working document and one or more first routings associated with the first sub-process.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Execution systems often act as a bridge between back end servers and the workforce and/or automation systems that are employed to satisfy high-level goals. The back end servers typically have access to large quantities of data that is often stored in large data stores, such as complex databases, and/or the like. This data is typically heavily abstracted into high-level goals that is often far removed from the sub-processes that are to be performed to satisfy the high-level goals. To address this separation, sub-process lists, automation plans, and/or the like are typically prepared and then managed by the back end servers to assign the sub-processes, monitor the sub-processes, and record successful and/or unsuccessful completion of the sub-processes. In some embodiments, the sub-process lists, automation plans, and/or the like may include instructions regarding the performance of manufacturing sub-processes, supervision of inventory management, and/or the like.

According to some embodiments, execution systems often use computing algorithms to combine high-level goals into beneficial work batches, increasing efficiency across the total collection of work requirements. Efficient batches help reduce cost-driving activities such as travel time, repetition, inter-facility congestion, energy consumption, computing and/or networking bandwidth, and/or the like.

Aspects of the this disclosure are described within the context of execution systems for aiding a human workforce in the performance of complex sub-processes, however, it is understood that the aspects of this disclosure may be adapted to work with automated and/or semi-automated systems.

According to some embodiments, once a sub-process list has been selected for performance, the sub-process list is distributed to the human workforce and automation systems for execution. Sub-processes of the sub-process list serve as instructions to the human workforce and/or automation system to convey the general job process and specific requirements of the current demands. Once assigned, the human workforce and/or automation systems can commence work on the sub-processes in the sub-process list.

Each member of the workforce and/or automation system has access to a conduit to the execution system and/or back end server for receiving the instructions for the sub-processes in the sub-process list. In some examples, the instruction delivery mediums may include one or more of a printed paper report, a printed label batch with instructional information that may also become an artifact or component of the completed work output, a fixed position computer monitor, a fixed position computer workstation, a fixed position specialized computing device (e.g., a light bar), a vehicle mounted mobile computer, a handheld mobile computer, a smart phone, a tablet, a body-worn mobile computer, a body-worn speech synthesis and recognition headset, an electronic transmission sent to an automation system, and/or the like.

As the human workers and/or automation systems complete the sub-processes, either successfully or with exceptions, each worker and/or automation system updates the execution system and/or back end server as to sub-process completion progress. The execution system and/or back end server uses these updates for the purposes of assigning the next sub-processes and/or updating the status of high-level goals associated with the sub-processes being performed. As with the instructions from the execution system and/or back end server, each member of the workforce and/or automation system has access to a conduit to the execution system and/or back end server for providing these updates. In the examples of printed instructions, sub-process execution status may be entered in batch at a fixed workstation either by the worker or a data entry clerk. In the examples of mobile computing equipment, the updates may be made real-time. In some examples, electronic sensors may be employed to provide updates. In some examples, fixed position scanners, light sensors, scales, RFID readers, and/or the like may send electronic transmissions to the execution system and/or back end server, which indicate the presence and/or status of a completed work product.

According to some embodiments, the conduit for communications between the human worker and the execution system and/or back end server may introduce manual effort, and therefore cost, into the execution of the sub-process itself. In some examples, for a worker to manually manipulate a printed report, hand-held or vehicle-mounted mobile computing device, and/or travel to a fixed workstation, physical effort is required and time is expended, which exists in the process for the sole purpose of human/computer system interaction and may introduce inefficient overhead into the performance of the sub-processes on the sub-process list.

According to some embodiments, performance of these sub-processes typically involves interaction between the data in the back end data stores and the systems interacting with the workforce at the place of sub-process performance and/or the automation systems performing the sub-processes. This may include initially identifying the back end data that describe the goals of the sub-processes, tracking and monitoring the sub-processes as they are performed, and/or modifying and/or recording data regarding the completion of the sub-processes. In some embodiments, when the back end servers are directly monitoring the sub-processes, this includes a high-level of involvement with the back end servers as the sub-processes are being performed. In some examples, this may include constant, regular, and/or periodic contact between a back end server and an execution system (e.g., via a network connection). In some examples, this may additionally consume significant network bandwidth as data is sent back and forth and/or significant computing resources of the back end servers as data is being read from and/or written to the data stores, translated to and/or from the formats used by the data stores and the formats used by the execution systems. In some examples, heavy-weight and complex software may also be used to describe the sub-processes, the data translations, to interface with the hardware and/or software of different execution systems, and/or the like. In some embodiments, when the execution systems operate in a more autonomous fashion, each execution system may include heavy-weight clients that may be customized for each of the sub-processes and/or sets of sub-processes that are to be performed. In some embodiments, these approaches often involve the development of costly hardware and/or software solutions that are not easily adapted to changes in sub-processes and/or input/output devices.

According to some embodiments, many of the inefficiencies of these other approaches may be reduced through the use of execution systems having a workflow engine that can receive workflow definitions from a server, perform and/or supervise the performance of sub-processes in the workflow definitions, and manage data locally through the use of unstructured and/or semi-structured mechanisms.

Figure 1:
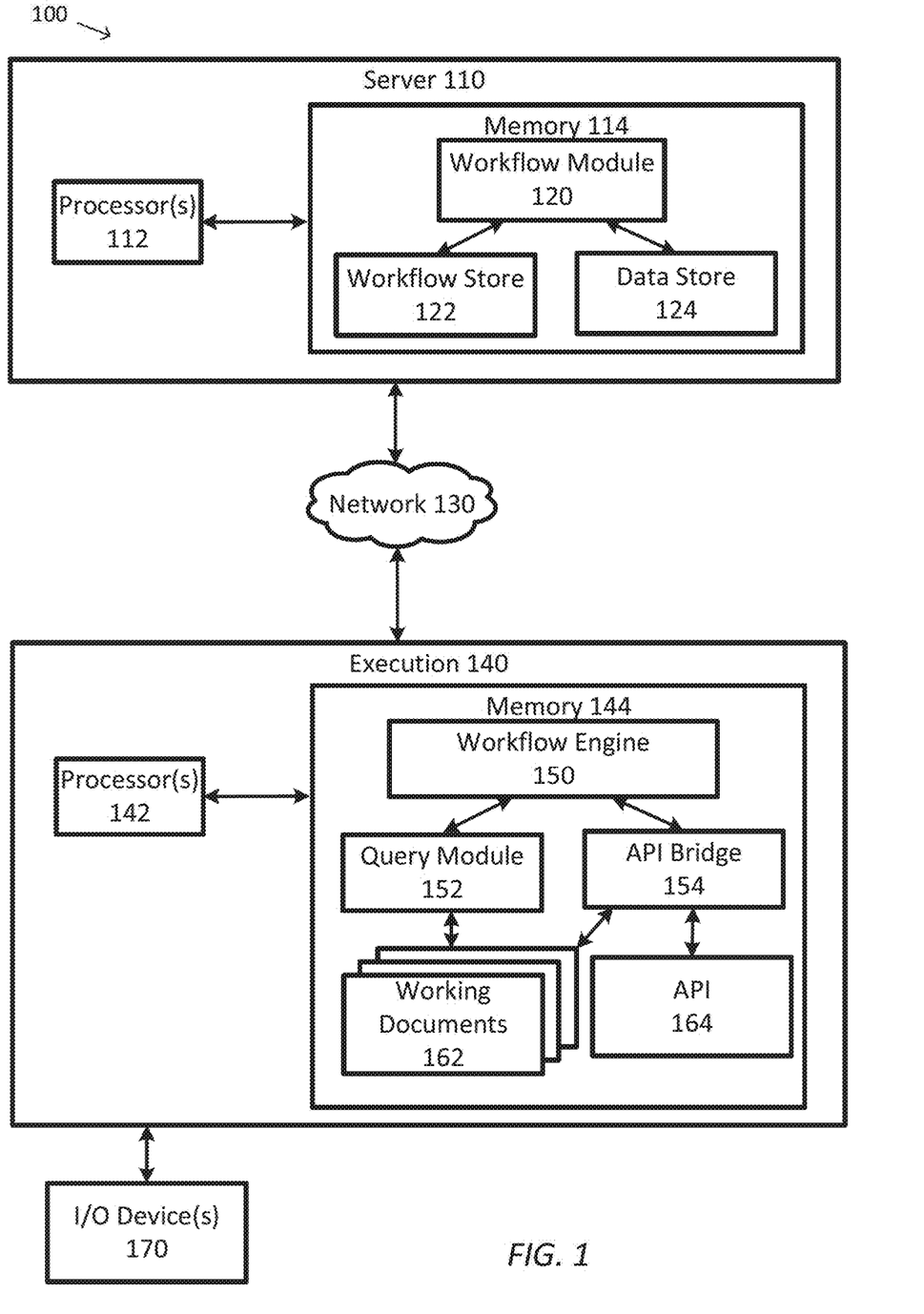
FIG. 1 is a simplified diagram of a computing system usable for workflow performance according to some embodiments.

FIG. 1 is a simplified diagram of a computing system 100 usable for workflow performance according to some embodiments. As shown in FIG. 1, computing system 100 is built around a client-server model; although other arrangements of the structures are possible as would be understood by one skilled in the art and/or as further described below. Computing system 100 includes a server 110. In some examples, server 110 is a back end server responsible for managing data at an enterprise level and/or the tracking of high-level goals. Server 110 includes one or more processors 112 coupled to memory 114. Operation of server 110 is controlled by the one or more processors 112. Each of the one or more processors 112 may correspond to a central processing unit, a multi-core processor, a microprocessor, a microcontroller, a digital signal processor (DSP), a graphics processing unit (GPU), a field programmable gate array (FPGA), an application specific integrated circuit (ASIC), and/or the like. Server 110 may be implemented as a stand-alone system, a subsystem and/or board added to a computing device, and/or as a virtual machine.

Memory 114 may be used to store software executed by the server 110, one or more data structures, databases, and/or the like used during operation of server 110. Memory 114 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 114 includes a workflow module 120 for assigning, managing, monitoring, and/or like workflows that include sub-process lists to be performed with the aid of one or more execution systems. Workflow module 120 has access to a workflow store 122. Workflow store 122 includes descriptions of workflows and their associated sub-process lists that are used to achieve high-level goals as is described in further detail below. Workflow module 120 further has access to a data store 124. Data store 124 includes the enterprise data that specify the high-level goals, track the fulfillment of those goals, and/or the like. In some examples, workflow module 120 receives a request for a workflow from an execution system and/or assigns a workflow to an execution system. The workflow is read from workflow store 122. Data specific to the workflow is then read from data store 124 and placed in a working document using an unstructured and/or semi-structured format. The workflow and the working document are then passed to an execution system for performance. When performance of the workflow is finished, workflow module 120 receives a working document from the execution system with the results of the workflow performance. Workflow module 120 then extracts data from the working document, stores it in data store 124, and then updates the status of one or more high-level goals associated with the workflow. In some examples, workflow store 122 and/or data store 124 may be implemented as one or more data structures, databases, file systems, and/or the like. And although workflow module 120 is depicted as a software module, workflow module 120 may be implemented using hardware, software, and/or a combination of hardware and software.

Server 110 is coupled to one or more execution systems via a network 130. Network 130 may include one or more cables, connectors, buses, network switching devices, routing devices, and/or the like. Network 130 may further include one or more LANs (e.g., an Ethernet), one or more WANs (e.g., the internet), and/or the like. In some examples, network 130 may include one or more wireless devices such as one or more access points, cellular network nodes, and/or the like.

FIG. 1 further shows a representative execution system as an execution system 140, which is coupled to server 110 via network 130. Execution system 140 includes one or more processors 142 coupled to memory 144. Operation of execution system 140 is controlled by the one or more processors 142. Each of the one or more processors 142 may correspond to a central processing unit, a multi-core processor, a microprocessor, a microcontroller, a digital signal processor (DSP), a graphics processing unit (GPU), a field programmable gate array (FPGA), an application specific integrated circuit (ASIC), and/or the like. Execution system 140 may be implemented as a stand-alone system, a subsystem and/or board added to a computing device, and/or as a virtual machine.

Memory 144 may be used to store software executed by the execution system 140, one or more data structures, databases, and/or the like used during operation of execution system 140. Memory 144 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 144 includes a workflow engine 150 for receiving, managing, performing, monitoring, reporting on, and/or like workflows received from server 110 and workflow module 120. Each workflow includes sub-process lists to be performed, data associated with the workflow, and/or the like that is described in further detail below. To aid its management of the workflows, workflow engine 150 has access to a query module 152 that provides access to one or more unstructured and/or semi-structured working documents 162 that include the data used during the performance of the workflows as is described in further detail below. In some examples, query module 152 may be able to handle queries written in a query syntax, such as SQL. In some examples, query module 152 may use a database engine, such as SQLite, Oracle, SQL Server, MyDB, and/or the like to aid in processing the queries. Workflow engine 150 also has access to an application programming interface (API) bridge 154 that provides access to an API 164. API bridge 154, at the direction of workflow engine 150, extracts data from one or more of the working documents 162, passes the data to an API function identified with a workflow, and returns the results of the API function to one or more working documents for further processing by workflow engine 150 as is described in further detail below.

According to some embodiments, each of workflow engine 150, query module 152, and/or API bridge 154 may be implemented using fairly lightweight clients that may be stored and executed on smaller and/or low-powered execution systems 140, such as smart phones, tablets, portable computers, and/or the like. In some examples, workflow engine 150, query module 152, and/or API bridge 154 may operate without relying on support from server 110 as a workflow is being performed, such as to perform back end data translation, storage for intermediate working data, and/or the like. In some examples, server 110 may play a limited role to provide a workflow and a working document before the workflow is performed and to receive the results from the completed workflow. In some examples, workflow engine 150 may be able to manage the workflow as it is being performed without network access to server 110. In some examples, query module 152 may operate without having to support heavyweight storage and data organization protocols such as relational databases and/or the like because working documents 162 contains unstructured and/or semi-structured data.

Execution system 140 is coupled to one or more input/output (I/O) devices 170. The one or more I/O devices 170 support the execution of workflows by providing sensing and/or monitoring capabilities, outputting instructions, providing status updates and other information, and/or the like. In some examples, the one or more I/O devices may include one or more displays, heads up displays, audio output devices (e.g., speakers, headphones, ear buds, etc.), audio input devices (e.g., microphones), imaging devices (e.g., monoscopic cameras, stereoscopic cameras, scanning devices, etc.), input devices (e.g., switches, mice, trackballs, joy sticks, scroll wheels, etc.), sensors (e.g., light, sound, temperature, force, pressure, etc.), actuators (e.g., motors, servos, solenoids, etc.), haptic devices, and/or the like. Each of the one or more I/O devices 170 may be wired to (e.g., via a USB or other cable connection) and/or wirelessly coupled to (e.g., via Bluetooth, Bluetooth Low Energy, RFID, near field communication, etc.) execution system 140 and/or one or more processors 142. The API functions in API 164 provide an interface so that workflow engine 150 and/or API bridge 154 are able to access the functionality provided by each of the one or more I/O devices 170. In some examples, API 164 may use a facade interface approach so that the workflows being managed by workflow engine 150 may identify API functions by their desired function and/or behavior while remaining device independent with respect to the specific one or more I/O devices 170 coupled to execution system 140. In some examples, one or more drivers may be used to provide device specific interfaces to the one or more I/O devices 170 for the API functions in API 164.

Figure 2:
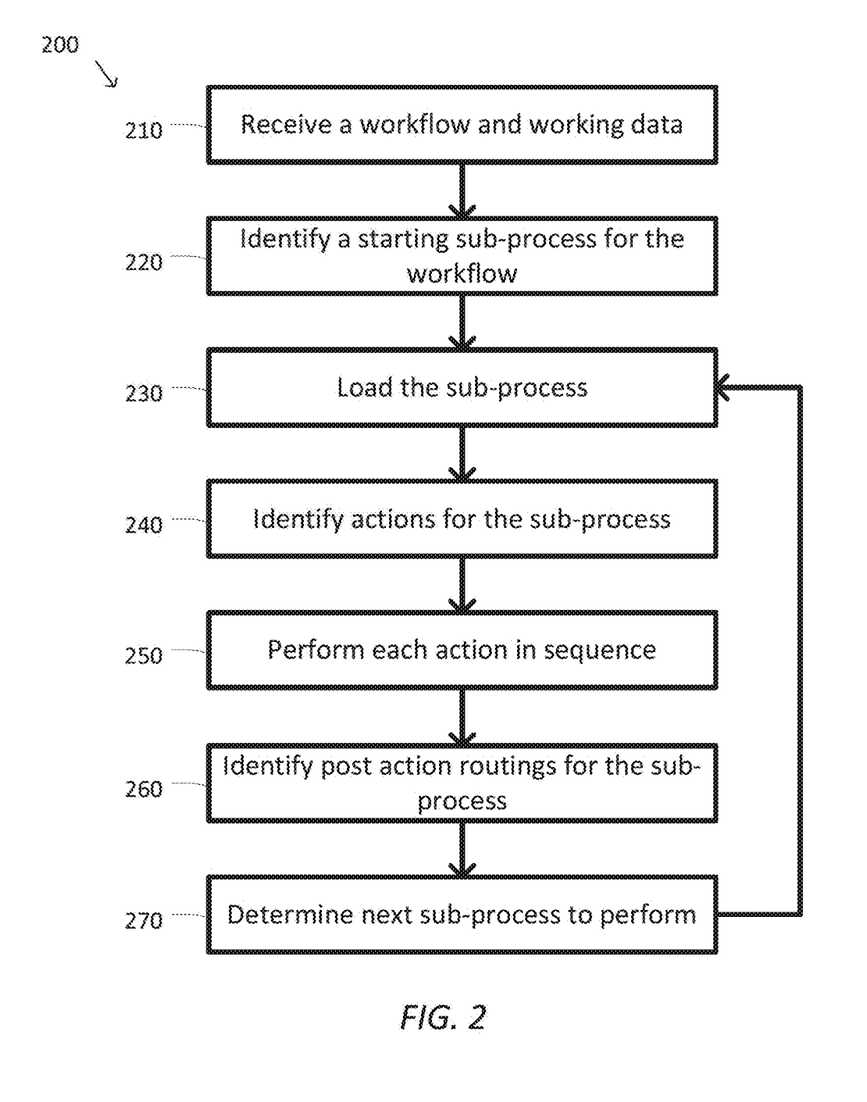
FIG. 2 is a simplified diagram of a method of workflow performance according to some embodiments.

FIG. 2 is a simplified diagram of a method 200 of workflow performance according to some embodiments. One or more of the processes 210-270 of method 200 may be implemented, at least in part, in the form of executable code stored on non-transitory, tangible, machine readable media that when run by one or more processors may cause the one or more processors to perform one or more of the processes 210-270. In some examples, method 200 may be implemented by a workflow engine, such as workflow engine 150.

At a process 210, a workflow and working data are received. In some examples, the workflow and working data may be received from a workflow module (e.g., workflow module 120) executing on a back end server (e.g., server 110). In some examples, the workflow and working data may be received over a network (e.g., network 130), from a portable data module (e.g., a portable flash drive), and/or the like. In some examples, the workflow may be received from a workflow store (e.g., workflow store 122). The workflow describes the sub-processes that are performed as part of the workflow, the order of the sub-processes, and/or the like. In some examples, the workflow is described via a semi-structured document that uses a workflow grammar.

Figure 3:
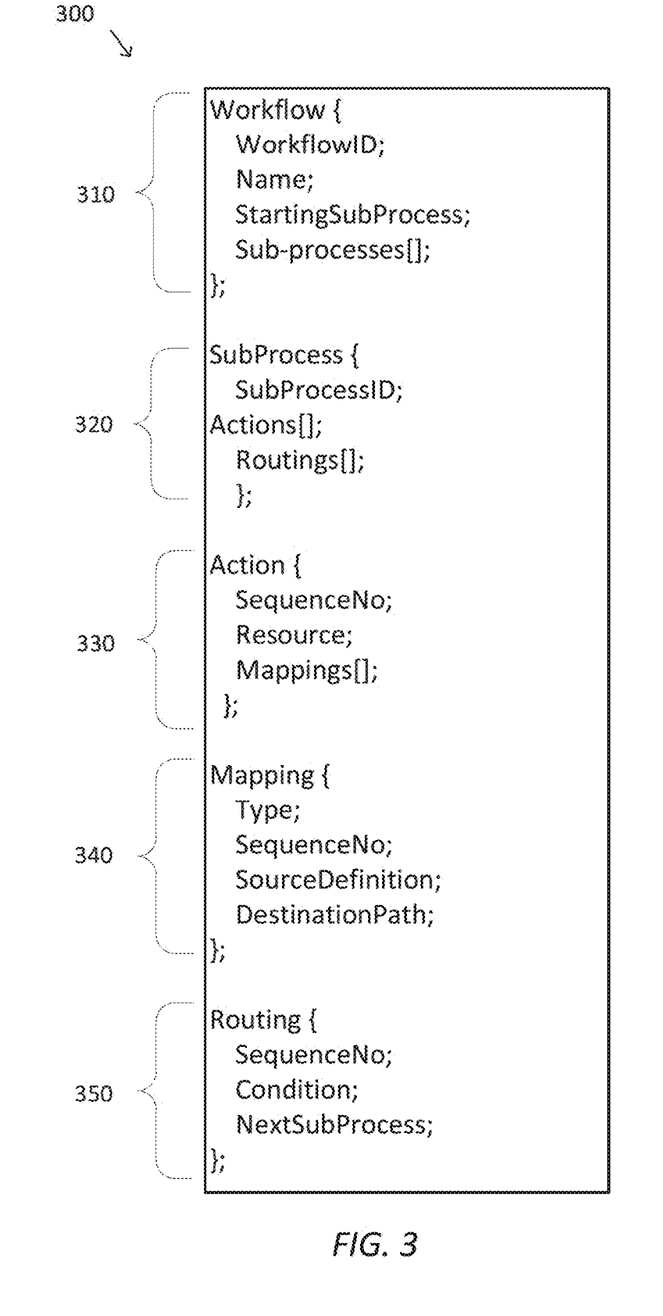
FIG. 3 is a simplified diagram of a workflow structure according to some embodiments.

FIG. 3 is a simplified diagram of a workflow structure 300 according to some embodiments. Workflow description describes a workflow grammar that may be used to specify a workflow without having to write custom source code and/or a heavy-weight client for each workflow. Each of the object descriptions is depicted in FIG. 3 using a programming language like notation (e.g., similar to C structs, C++ or java objects, and/or the like) suitable to show the various elements of a workflow and the various fields of each of the elements. However, it is understood that, in practice, these element descriptions may be easily adapted to other storage and definition paradigms such as markup schemas (e.g., eXtensible Markup Language (XML), Simple Object Access Protocol (SOAP), JavaScript Object Notation (JSON), etc.), flat files, and/or the like. It is further understood that even though the types of the various fields are not shown in FIG. 3, suitable data types may be selected based on the medium used to implement the elements and the purposes of the fields. As shown, the element descriptions in FIG. 3 include the fields that are useful for describing workflows that are performable using an execution system, such as execution system 140. In addition, the element descriptions may include additional fields that are not shown, including fields for recording other useful information and/or metadata about the workflow, the sub-processes, and/or the other elements.

A Workflow element 310 is used to describe the workflow generally. A WorkflowID field is used to identify the workflow so that it may be identified and/or tracked between the server and the execution system. In some examples, the WorkflowID value may be globally unique and/or represent the type of workflow. In some examples, the WorkflowID value may be an integer, a character string, and/or the like. In some examples, the workflow may be indexed by the WorkflowID field. An optional Name field is used, for example, as a display name when the corresponding workflow is presented to a user (e.g., on a user interface), and/or the like. An InitialSubProcess field identifies the first sub-process to perform by specifying a sub-process identifier for the corresponding sub-process. The Workflow element 310 further includes a list of SubProcesses that form the body of the workflow.

Each of the SubProcesses in the Workflow element 310 is described using a SubProcess element 320. Each SubProcess Element 320 includes a SubProcessID that uniquely identifies the SubProcess within the workflow. In some examples, the SubProcessID may be an integer or character string value. Each SubProcess Element 320 further includes a list of Actions to perform as part of the SubProcess. Each SubProcess Element 320 further includes a list of Routings that describe, based on the performance of the Actions, which is the next SubProcess to be performed.

Each of the Actions in each SubProcess element 320 is described using an Action element 330. Each Action element 330 includes a SequenceNo field, which is an integer value that identifies an ordering among the Actions in the corresponding SubProcess. The Actions within each corresponding SubProcess are performed in an order based on the ordering of the SequenceNo values. Each Action element 330 further includes a Resource field that identifies an API function call that is executed in order to perform the Action. Each Action element 330 further includes a list of Mappings, which describe data values that are used by the corresponding API function and the results from the API function as is described in further detail below. In some examples, each action corresponds to an API function call. Although not shown, each Action element 330 may include additional fields including one or more fields that describe a type of the action (e.g., human-machine interaction, data recordation, etc.), an action description, one or more device restrictions (e.g., to specific types and/or models of I/O devices, etc.), and/or the like.

Each of the Mappings in each Action element 330 is described using a Mapping element 340. Each Mapping element 340 includes a Type field that indicates whether the Mapping describes a mapping that should occur before the API function is performed (e.g., to get an input parameter) or after the API function is performed (e.g., to record a result of the API function). Each Mapping element 340 further includes a SequenceNo field, which is an integer value that identifies an ordering among the Mappings in the corresponding Action. The Mappings with each corresponding Action are performed in an order based on the ordering of the SequenceNo values. Each Mapping element 340 further includes a SourceDefinition field that describes how the value for the corresponding parameter is determined. In some examples, the SourceDefinition field may include a literal value, a mix of literal values and data references, and/or one or more data references. In some examples, the data references may be expressed in a query language, such as a variation of Structured Query Language (SQL), that provides sufficient context to find the corresponding value (e.g., via its name-value pair) in the working document associated with the workflow. In some examples, the query language may include support for identifying data by its name (e.g., from a name-value pair), by indexes (e.g., when an array and/or list of values are grouped by the same name), by dot notation (e.g., to indicate a sub-field name of a compound value), and/or the like. In some examples, the SourceDefinition field may include notation (e.g., a specific character such as "@") to distinguish between literal values and values that are specified via a data reference. Each mapping element 340 further includes a DestinationPath field that identifies a name (e.g., within a name-value pair) in which the value or values mapped according to the SourceDefinition field are identified. In some examples, the DestinationPath field may identify a name of a corresponding API function parameter.

Each of the Routings in each SubProcess element 320 is described using a Routing element 350. Each Routing element 350 includes a SequenceNo field, which is an integer value that identifies an ordering among the Routings in the corresponding SubProcess. The Routings within each corresponding SubProcess are evaluated in an order based on the ordering of the SequenceNo values. Each Routing element 350 further includes a Condition field, which identifies a Boolean condition that determines whether this Routing identifies the next SubProcess to perform. In some examples, the Condition field may include any number of literal values, data references (e.g., similar to the SourceDefinition field), comparison operators (e.g., <, >, ==, etc.), Boolean operators (e.g., not, and, or), and/or the like. Each Routing element further includes a NextSubProcess field that identifies the SubProcessID of the next SubProcess to perform if the condition of the Condition field is satisfied.

Referring back to FIG. 2 and process 210, the working data may be received as a working document that includes the data associated with the workflow. In some examples, the working data may be specific to the specific instance of the workflow and/or generic across workflows of the same type. In some examples, the working document includes the data in an unstructured format as, for example, name-value pairs that identify particular pieces of data and their corresponding values. In some examples, each of the names in the name-value pairs identifies a corresponding piece of data that the workflow references by that name. In some examples, working data in the working document may be limited to just the data that the workflow needs from the back end server and data store to complete the workflow. Thus, the working data need not be cluttered with other data items not used by the workflow and/or complex data structures and/or objects that are stored in the data store and include one or more data fields are not used by the workflow. In some examples, the working document may be semi-structured using a format such as XML, JSON, SOAP, and/or the like.

At a process 220, a starting sub-process for the workflow is identified. The starting sub-process corresponds to the first sub-process that is to be performed as part of the workflow. In some examples, the starting sub-process may be identified using the StartingSubProcess field of Workflow element 310 from the workflow received during process 210.

At a process 230, the sub-process is loaded. The current sub-process to be performed is loaded from the workflow received during process 210. In some examples, the current sub-process is the starting sub-process identified by process 220 or the next sub-process identified by a process 270 as described in further detail below. In some examples, the sub-process to be loaded is identified by a unique SubProcessID within the workflow. In some examples, loading the sub-process is performed by reading SubProcess element 320 matching the SubProcessID of the sub-process.

At a process 240, the actions for the sub-process are identified. In some examples, the actions for the sub-process are identified by reading each of the Action elements 330 associated with the sub-process loaded during process 230. In some examples, the actions may also be sorted according to their respective SequenceNo fields in order to determine their order of performance.

At a process 250, each action is performed in sequence. In some examples, the actions identified during process 240 are iterated though in the order of their corresponding SequenceNo field values, such as by working through the actions as sorted by process 240. According to some embodiments, each action is performed according to a method 400 as described with respect to FIG. 4. One or more of the processes 410-440 of method 400 may be implemented, at least in part, in the form of executable code stored on non-transitory, tangible, machine readable media that when run by one or more processors may cause the one or more processors to perform one or more of the processes 410-440. In some examples, method 400 may be implemented by a workflow engine, such as workflow engine 150. In some embodiments, the processes of method 400 may be performed in an order different than the implied ordering of FIG. 4. In some examples, processes 410 and 420 may be performed concurrently and/or process 420 may be performed before process 410.

Figure 4:
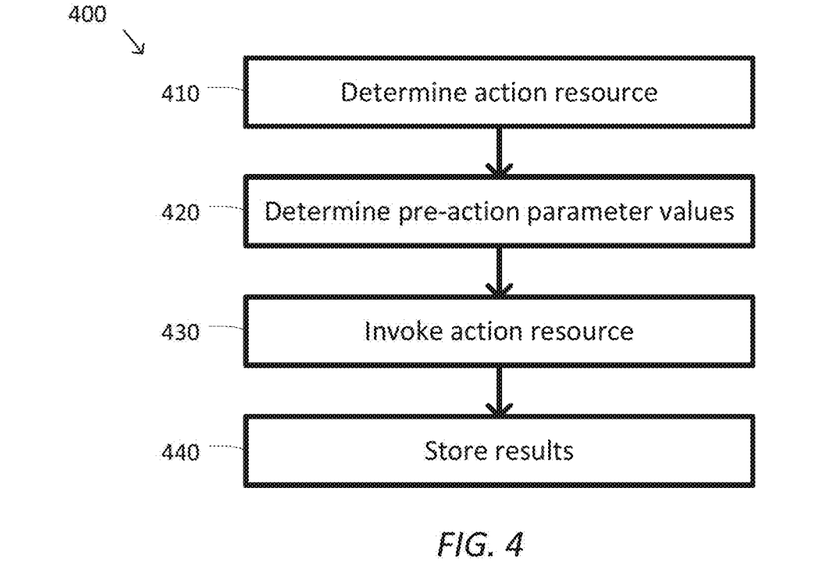
FIG. 4 is a simplified diagram of a method of action performance according to some embodiments.

At a process 410 an action resource is determined. In some examples, the action resource corresponds to an operation that is to be performed as part of the action. In some examples, the action resource may correspond to an API function call. In some examples, the action resource may depend on input from a user and may not complete until a corresponding response is received from the user. In some examples, the action resource may be determined by reading from the Resource field of the corresponding Action element 330. In some examples, when the API (e.g., API 164) is organized according to a facade interface, it is possible for the action resource to be specified by name without having to worry about variations in type and/or model among the I/O devices that are coupled to the execution system.

At a process 420, pre-action parameter values are determined. In order for the action resource to be performed (e.g., the API function to be called) each of the input parameters to the action resource is determined. In some examples, the number and names of each of the parameter values is determined based on corresponding mappings for the action. In some examples, the mappings may be determined using the corresponding Mapping elements 340 for the action. In some examples, each of the mappings is processed in the order of its corresponding SequenceNo field value, such as by sorting each of mappings by the SequenceNo field. In some examples, only those mappings with a Type field value that indicates the mapping is a pre-performance mapping are processed during process 420. In some examples, the name for the parameter is determined from the DestinationPath field of the corresponding Mapping element 340. In some examples, the value for the parameter is determined according to the corresponding SourceDefinition field of the corresponding Mapping element 340. In some examples, processing of the SourceDefinition field may include querying a working document (e.g., the working document received during process 210) according to a query included in the SourceDefinition field. In some examples, the query may identify the working document to query. In some examples, because the structure and/or hierarchy of the working document is not constrained by the workflow engine, it is not necessary for the query to specify more than the name (or name with index and/or sub-field notation) in order for the corresponding value to be retrieved from the working document. Thus, as long as the author of the workflow is careful to ensure that each value queried for was added to the working document before the performance of this action, it is not necessary for the query to specify more than the name. In some examples, the query may be processed by a query module, such as query module 152. Once the name and value of the parameter are determined, they are written to a working document. In some examples, the working document is different from the working document of the workflow. In some examples, the working document may correspond to a request working document used by an API bridge, such as API bridge 154.

At a process 430, the action resource determined during process 410 is invoked in order to perform the action. In some examples, the API bridge uses the request working document to generate and populate instances of objects and/or variables corresponding to each of the parameters and their values determined during process 420. The API function determined during process 420 is then called using the parameter values and the results of the API function call are determined. In some examples, the results of the API function call are written to a working document, such as a result working document. In some examples, Binary JSON serialization (BSON) may be used to prepare the parameters and values from the request working document.

At a process 440, the results of the action are stored. In some examples, the results of performing the action are moved from the result working document to the working document for the workflow. In some examples, mappings corresponding to the action whose Type field value indicates that the mapping is a post-performance mapping are used to identify data from the result working document and write them to the working document for the workflow so that they are available for the next action or the next sub-process. In some examples, a process similar to process 420 is used to query for values from the result working document according to the corresponding SourceDefinition field and then write to the working document for the workflow with a naming based on the corresponding DestinationPath field. Once each of the post-performance mappings is used to store the results of the action, performance of the action completes.

Referring back to FIG. 2, at a process 260, once all the actions for the sub-process are performed, post action routings for the sub-process are identified. The post action routings identify the possible next sub-process to be performed based on the results of performing the actions in the sub-process and/or from previous sub-processes. In some examples, the routings may be identified from the Routing elements associated with the sub-process loaded during process 230. In some examples, the routings may also be sorted according to their respective SequenceNo fields in order to determine their order of evaluation.

At a process 270, the routings are evaluated to determine the next sub-process to perform. In some examples, the routings identified during process 240 are iterated though according to a method 500 as described with respect to FIG. 5. One or more of the processes 510-540 of method 500 may be implemented, at least in part, in the form of executable code stored on non-transitory, tangible, machine readable media that when run by one or more processors may cause the one or more processors to perform one or more of the processes 510-540. In some examples, method 500 may be implemented by a workflow engine, such as workflow engine 150.

Figure 5:
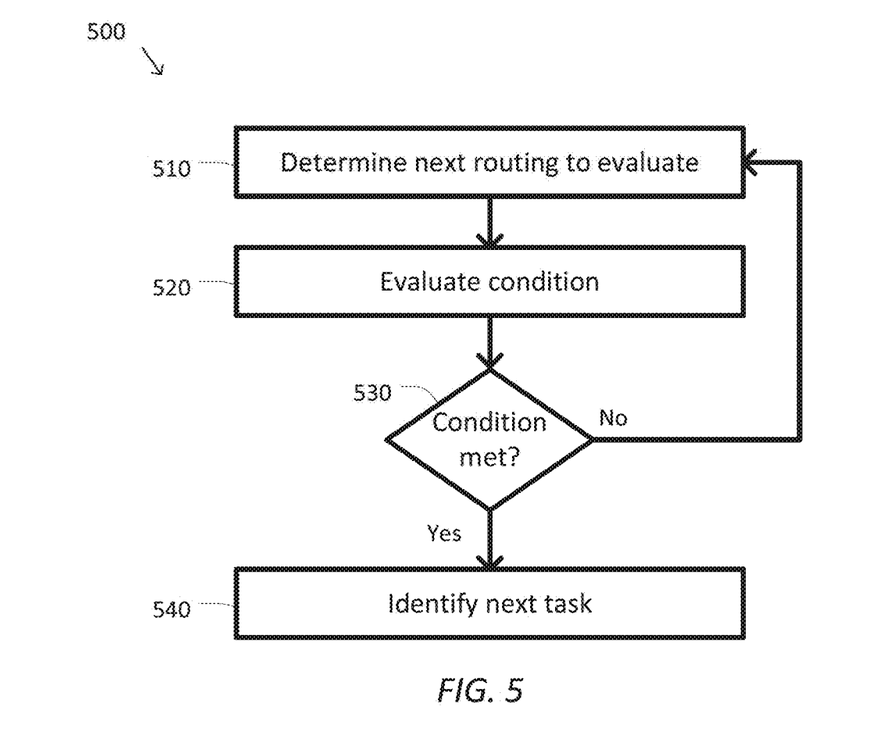
FIG. 5 is a simplified diagram of a method of sub-process routing according to some embodiments.

At a process 510, the next routing to evaluate is determined. In some examples, the next routing to evaluate is determined based on the sorting order of the routings as determined by the SequenceNo sorting of process 260 beginning with the routing with the lowest SequenceNo value and proceeding with the next one in order each time process 510 is performed.

At a process 520, the condition associated with the routing is evaluated. In some examples, the condition is determined based on the Boolean equation included in the Condition field of the corresponding Routing element 350. In some examples, evaluation of the condition may include performing one or more queries on the working document for the workflow so that the results of evaluating the condition may be based on the results of performing one or more previous actions. In some examples, the evaluation of the condition may be based on a general success and/or failure of the most recent action performed.

At a process 540, it is determined whether the condition evaluated during process 520 is met. When the condition evaluates to true (e.g., the condition is met) the next sub-process to perform is identified using a process 540. When the condition evaluates to false (e.g., the condition is not met), the next routing to evaluate is determined by returning to process 510.

At the process 550, the next sub-process is identified. In some examples, the next sub-process is identified according to the NextSubProcess field of the Routing element 350 corresponding to the condition evaluated during process 520. In some examples, the next sub-process to evaluate may correspond to an end workflow indication.

Referring back to FIG. 2, during process 270 once the next sub-process to perform is identified, method 200 returns to process 230 to load the next sub-process.

Application of methods 200, 400, and 500 and workflows based on workflow structure 300 by execution system 140 are now described in the context of an example workflow using a wearable computing system. The workflow is part of an inventory management system, which streamlines the ability of a user, or alternatively an automated system, to select a set of items that fulfill a job order, a parts list, and/or the like.

Figure 6:
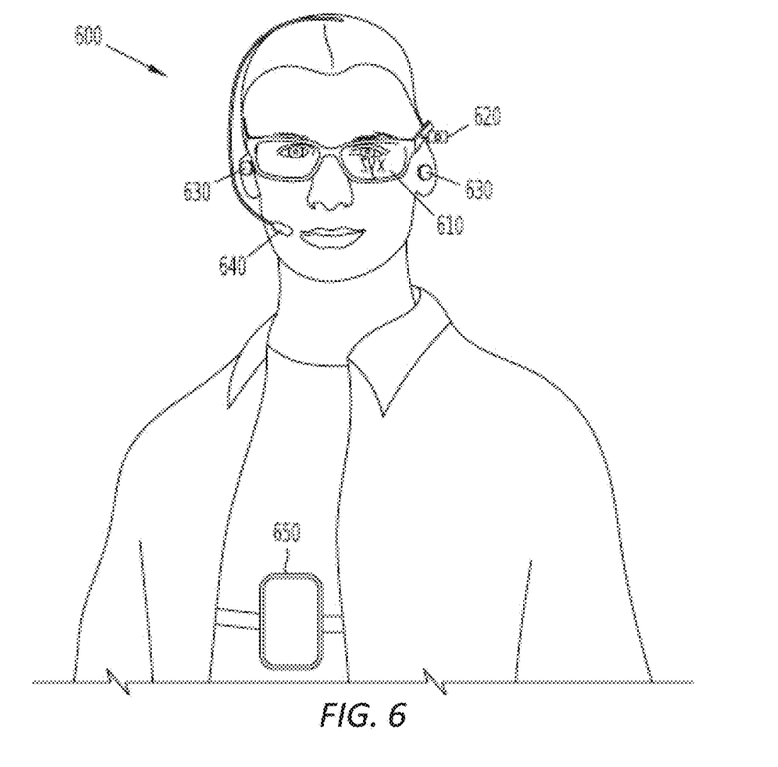
FIG. 6 is a simplified diagram of a wearable computing system according to some embodiments.

FIG. 6 is a simplified diagram of a wearable computing system 600 according to some embodiments. In some embodiments, wearable computing system 600 is consistent with execution system 140 and I/O devices 170 of FIG. 1. As shown in FIG. 6, a user is outfitted with wearable computing system 600, which is designed to support the user in performing a part picking workflow without interfering with the user's primary sub-processes of selecting and placing parts in a tote. Wearable computer system 600 includes a heads up display 610 including a pair of glasses or goggles on which information to guide the user and/or provide feedback may be superimposed. Attached to heads up display 610 is an imaging device 620, such as a digital camera, for providing wearable computing system 600 with images as seen by the user (e.g., wearable computer system 600 sees what the user sees). In some examples, images captured by imaging device 620 are evaluated to detect specific content and because the images approximately correspond to what the user sees through heads up display 610, heads up display 610 may be used to superimpose useful information over the images the user sees. In some examples, imaging device 620 may be monoscopic or stereoscopic. Wearable computer system 600 further includes a set of earpieces 630 that may be used to provide audio feedback to the user including audible feedback tones (e.g., chimes, beeps, and/or the like), verbal directions, and/or the like. And although earpieces 630 are shown, other configurations are possible including over the ear headphones, and/or the like.

In some examples, wearable computing system 600 may further include a microphone 640 for receiving environmental sounds, verbal directions, and/or the like. In some examples, a signal and/or audio processing sub-system (not expressly shown) may be used to convert the speech of the user into text-based commands for wearable computing system 600. And although microphone 640 is shown as a boom microphone, other configurations are possible including a lapel microphone, and/or the like.

In some embodiments, wearable computing system 600 may further include additional input devices such as scanners, sensors, and user input devices. In some examples, the user input devices may include one or more switches, push buttons, tap panels, pressure-sensitive surfaces, and/or the like, such as glove-mounted, belt-mounted, lapel mounted, and/or the like that may be used by the user to provide confirmation of events and/or activities.

As additionally shown in FIG. 6, wearable computing system includes a computing device 650, which may be consistent with execution system 140. As shown, computing device 650 is waist-mounted, but other configurations are possible including a backpack-based mount, an arm and/or wrist band mount, and/or integration with heads up display 610. Depending upon the embodiment, one or more of heads up display 610, imaging device 620, headphones 630, and/or microphone 640 may be coupled to computing device 650 using one or more cables and/or wirelessly.

Figure 7:
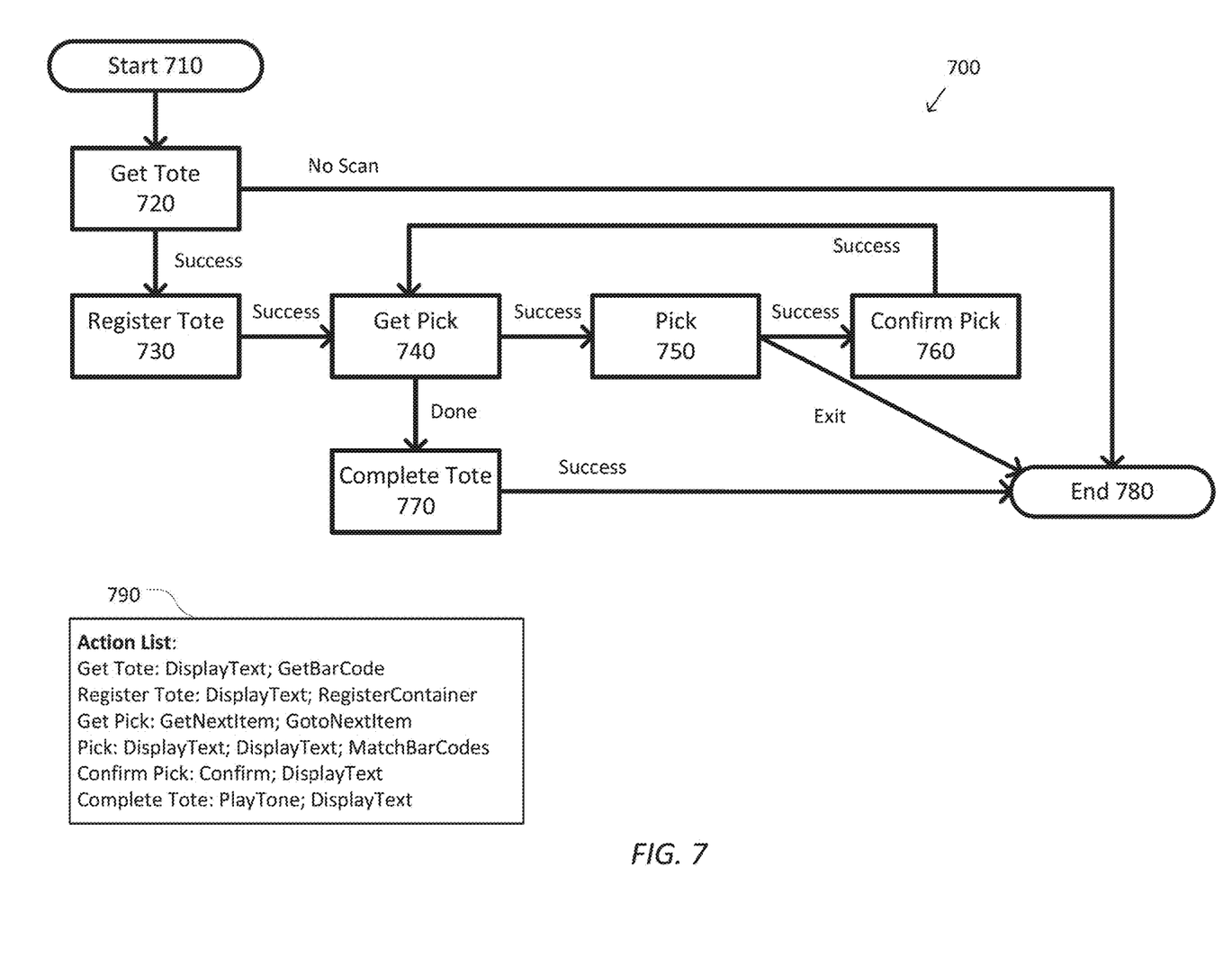
FIG. 7 is a simplified diagram of an example workflow according to some embodiments.

FIG. 7 is a simplified diagram of an example workflow 700 according to some embodiments. In some examples, workflow 700 may be received by computing device 650 according to process 210. As shown in FIG. 7, workflow 700 is shown using a state-machine like notation where sub-processes are shown as boxes and the routings are shown as transition arrows between the boxes.

Figure 8:
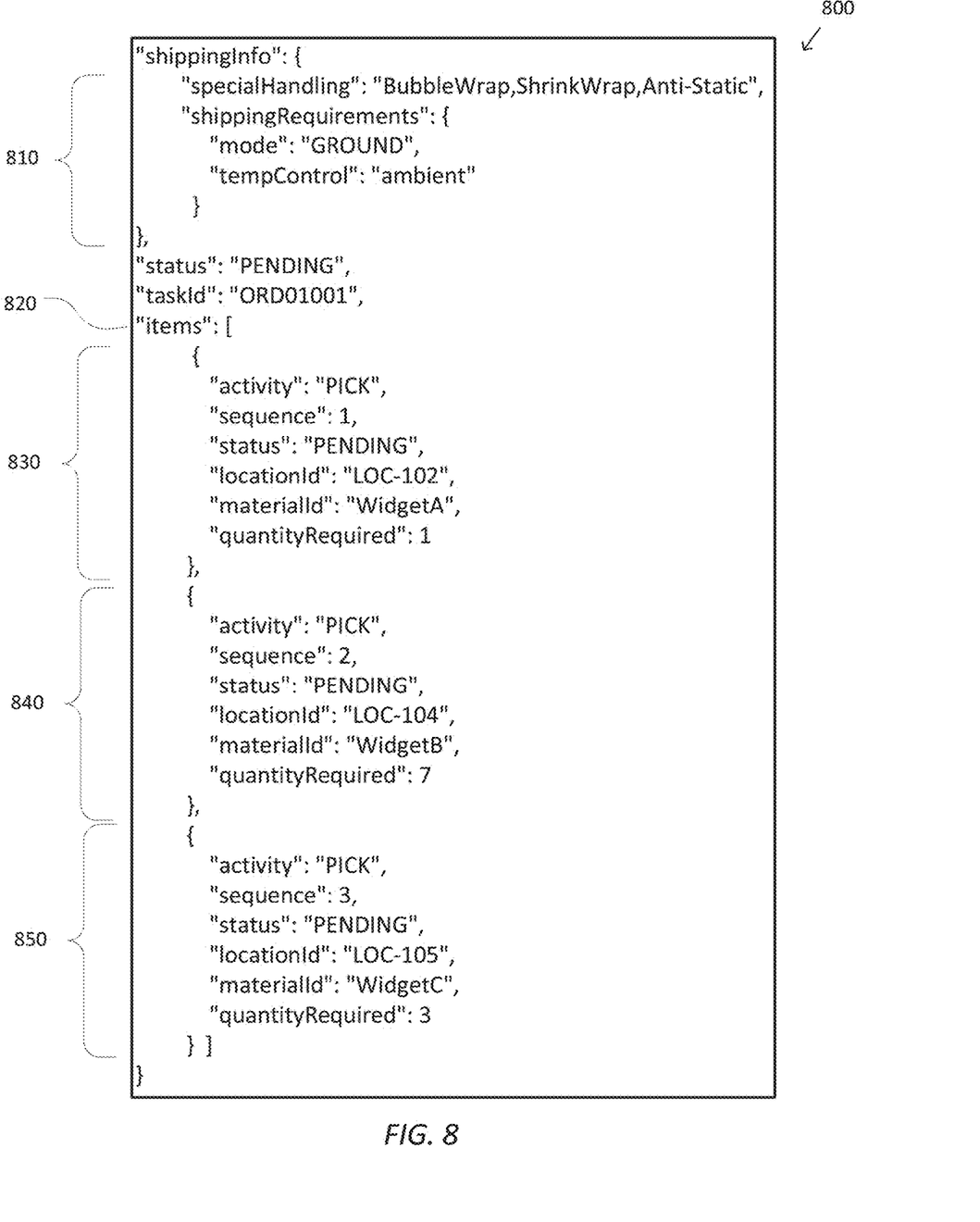
FIG. 8 is a simplified diagram of a portion of a working document according to some embodiments.

FIG. 8 is a simplified diagram of a portion of a working document 800 according to some embodiments. In some examples, working document 800 may be received by computing device 650 along with workflow 700 according to process 210. As shown in FIG. 8, working document 800 shows an example of a semi-structured working document with data organized in a hierarchical fashion with some data elements in working document 800 having other data elements as sub-fields. A data element 810 is identified by the name shippingInfo and includes sub-fields named specialHandling and shippingRequirements. The shippingRequirements data element has sub-fields named mode and tempControl. The value of a data element is identified after a colon, and the nesting of data elements as sub-fields is indicated using braces. An example of a SourceDefinition of a mapping for accessing the mode data element may be "SourceDefinition":"'Deliver via:'||@shippingInfo.shippingRequirements.mode". This SourceDefinition shows the mixing of literals ('Deliver via:') and a query to the working document. In the example of working document 800, the result of this SourceDefinition would be "Deliver via: Ground". As another example, information in data element 810 may additionally be used within a Condition of a Routing to, for example, determine whether an optional sub-process to pack the items in shrink wrap (e.g., "Condition":"@shippingInfo.specialHandling like '%ShrinkWrap%'", where "%" is a wildcard operator and "like" is a comparison operator supported by the query processor and/or the workflow engine.

Working document 800 further includes an example of an array/list data element 820 with a name of items and the array/list designation by use of the square brackets enclosing data elements 830, 840, and 850, each of which is set apart from the others using braces and commas. Data element 830 identifies a first item to be picked with a sequence of 1, a locationID of "LOC-102", a materialID of "WidgetA" and a quantity of 1. The status sub-field indicates whether this item has been picked. An example of a SourceDefinition to access the description of this item is "SourceDefinition":"@items[@currentItem].materialID". Data elements 840 and 850 include information on the other items.

Referring back to FIG. 7, workflow 700 begins in start box 710, which may correspond to process 220. In start box 710 a starting sub-process for workflow 700 is identified, which in workflow 700 is a get tote sub-process 720.

Get tote sub-process 720 directs the user to obtain a tote for placing the picked items in. As shown get tote sub-process 720 includes actions for displaying text and getting a barcode. In some examples, one or more display text actions may each provide an API function call for displaying information on heads up display 610. In some examples, the display text action may include mappings for specifying the text to display, a location on the display, size, font, color, and/or the like. In some examples, the displayed text could be used to direct the user to obtain a tote, provide directions to where the totes are located, specify a size of the tote, specify a color of the tote, and/or the like. In some examples, the get barcode action may use images to look for barcodes, QR codes, and/or the like that are affixed and/or embossed on the tote. In some examples, the images may be obtained by imaging device 620 and/or another scanning device. In some examples, parameters for the get tote action may include types of barcodes that are supported, and/or the like. In some examples, the get barcode action may end when a suitable barcode is detected and/or when the user indicates that a tote has been selected (e.g., by pressing a button, saying a keyword, and/or the like. As further shown, get tote sub-process 720 includes two routings. In some examples, a no scan routing corresponds to a failure in the get barcode action. In some examples, the get barcode action may fail when a time out occurs without a suitable barcode being scanned, the get barcode action receiving the tote selection input from the user without the detection of a suitable barcode, and/or the like. When the no scan routing condition is met, the workflow ends by going to an end box 780. A success routing corresponds to successful scan of a barcode corresponding to a suitable tote. When the success routing condition is met the next sub-process is a register tote sub-process 730.

Register tote sub-process 730 includes a display text action and a register container action. The display text action may include a textual confirmation that the tote has been successfully registered by the register container action. In some examples, the display text may be replaced with and/or supplemented with a play tone action. In some examples, the register container action may add a name-value pair to the working document to record the tote number identified from the scanned barcode. In some examples, register tote sub-process 730 may further initialize an item index (e.g., a currentItem data element) in the working document to indicate that a first item is to be picked. Register tote sub-process 730 has a single routing that, upon success, indicates that a get pick sub-process 740 is the next sub-process.

Get pick sub-process 740 includes several sub-processes including a get next item action and a go to next item action. The get next item action includes examining the working document to identify a next item to pick and determining travel directions for moving from the current location to a location (e.g., by using a mapping to access the locationID sub-field of the current item being picked) where the next item is located. The go to next item action includes providing travel directions to get to the next item including, as appropriate, scanning and confirming barcodes identifying locations within the inventory warehouse (e.g., rows, shelving units, etc.). Get pick sub-process 740 includes two routings. When there are no more items to be picked and the order is done, the next sub-process is a complete tote sub-process 770. In some examples, the done routing may compare the item index from the working document and a total number of items value from the working document to determine when all the items have been picked. When get pick identified a next item to pick, the user successfully navigates to the location of the next item, and the success routing condition is met, the next sub-process is a pick sub-process 750.

Pick sub-process 750 includes two display sub-process actions and a match barcodes action. The display sub-process actions are used to display a description of the item (e.g., by using a mapping to access the materialID sub-field of the current item) to be picked and quantity (e.g., by using a mapping to access the quantityRequired sub-field of the current item) to be picked. The match barcode action scans the barcodes visible in images obtained by imaging device 620 and/or another scanning device and superimposes indicators on the bins indicating which of the barcodes is the correct barcode and which of the barcodes are not the correct barcode. In some examples, the match barcodes action may delay searching for and scanning the barcodes until the user provides an input (e.g., via a button and/or verbally) to begin the matching.

Figure 9:
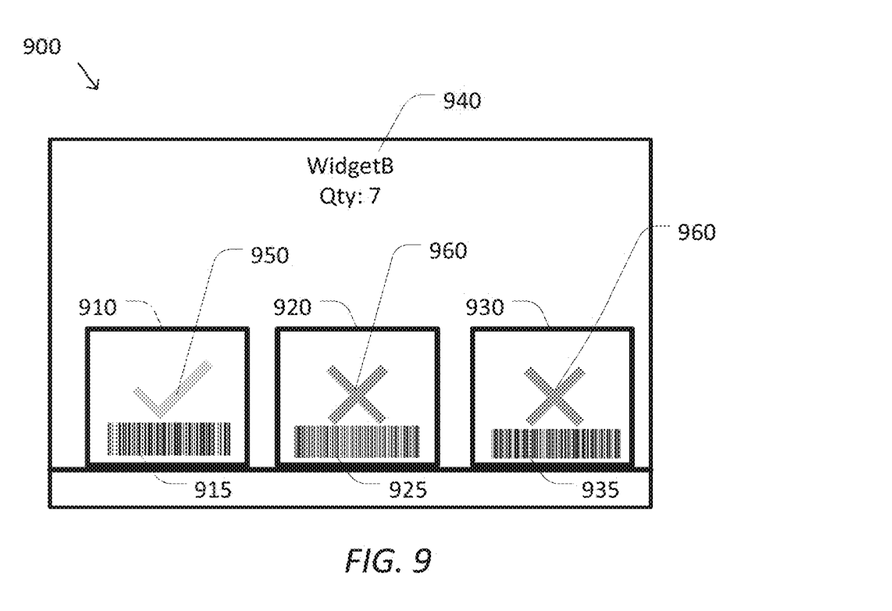
FIG. 9 is a simplified diagram of a user interface according to some embodiments.

FIG. 9 is a simplified diagram of a user interface 900 as might be seen during pick sub-process 750 according to some embodiments. As shown in FIG. 9, user interface 900 is a superimposition of data and information from computing device 650 as might be seen by the user using heads up display 610 as the item in data element 840 is being picked. Visible to the user is a shelf in a warehouse. Sitting on the shelf are three parts bins 910, 920, and 930. Each of bins 910, 920, and 930 includes a corresponding barcode 915, 925, and 935, respectively. However, only one of the barcodes 915, 925, and 935 corresponds to the item to be picked. To aid the user in picking the correct item, the display text action has been used to display a description of the items ("WidgetA") and a quantity to be picked ("Qty: 2"). The barcode to search for was previously determined during get pick sub-process 740. Also shown are superimposed indicators designating which bin includes the correct item. More specifically, a large check 950 is superimposed over the correct bin (in this case bin 910) and large Xs 960 are superimposed over the incorrect bins (in this case bins 920 and 930). In addition to being different shapes, check 950 and Xs 960 may be rendered in different colors.

Referring back to FIG. 7, pick sub-process 750 includes two routings. In some examples, an exit routing corresponds to the user providing an input (e.g., via a button and/or verbally) to exit workflow 700 without picking the current item (and any subsequent items). When the exit routing condition is met, the workflow ends by going to an end box 780. A success routing corresponds to successful match of the barcode corresponding to the desired item. When the success routing condition is met, the next sub-process is a confirm pick sub-process 760.

Confirm pick sub-process 760 includes a confirm action and a display text action. The confirm action waits for confirmation from the user that the correct quantity of items have been selected from the correct bin and placed in the tote. In some examples, the confirm action may wait until the user presses a button, says a keyword, and/or otherwise confirms that the item and quantity have been picked and placed in the tote. The display text action may include a textual confirmation that the pick is complete. In some examples, the display text may be replaced with and/or supplemented with a play tone action. In some examples, confirm pick sub-process 760 may increment the item index (e.g., the currentItem data element) stored in the working document. Confirm pick sub-process 760 has a single routing that, upon success, indicates that get pick sub-process 740 is the next sub-process.

Complete tote sub-process 770 includes a play tone action and a display text action. The play tone action provides an audible tone indicating that all the items have been successfully picked. The display text action provides a textual confirmation that all the items have been successfully picked. Complete tote sub-process 770 has a single routing that, upon success, indicates that the workflow is complete and workflow should go to end box 780.

According to some embodiments, the example workflow described above demonstrates many advantages over a more traditional system for guiding and/or supervising the user and/or automated system during the part picking workflow. In some examples, the integration of the heads up display allows the user to concentrate on the part picking workflow without having to aim a hand-held scanner on each barcode until a match is found. This frees of the user's hands to perform the picking without having to worry about holstering the scanner. In some examples, the convenient location of the feedback buttons and/or the use of audio feedback from the user also helps free up the user's hands for the primary sub-process of picking the items for placement in the tote. In some examples, this approach further eliminates the need for printed parts lists, and/or the like. In some examples, the use of heads up display 610 provides a clear visual confirmation of the correct items to be picking without districting the user from having to perform other actions of the correct parts bin, thus reducing the likelihood of item selection errors.

In some embodiments, the use of the workflow with the working document allows existing workflows to be modified and/or new workflows created without having to rewrite or write a custom heavy-weight client with each change in workflow. As long as the developer knows the desired order of the sub-process flow and how each of the actions is reading and/or writing name-value pairs to the working document, workflows can be quickly created that can be managed using a client device (e.g., execution system 140 and/or computing device 650) and do not require extensive bandwidth between the client device and a back end server and do not consume valuable processing resources of the back end server to manage the workflow during its performance and to provide data translation services for intermediate values determined during the workflow performance. In some examples, the further use of facade interfaces with the API allows the developer to draft workflows without having to know the specific capabilities, interfaces, etc. of each of the input devices and that can be used with different combinations of I/O devices without having to be rewritten.

Some embodiments of the execution systems described herein may include non-transient, tangible, machine readable media that include executable code that when run by one or more processors (e.g., the one or more processors 142 in execution system 140 and/or the one or more processors in computing device 650) may cause the one or more processors to perform the processes of methods 200, 400, and/or 500 as described above. Some common forms of machine readable media that may include the processes of methods 200, 400, and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A portable computing device comprising:
a memory; and
one or more processors coupled to the memory and one or more input/output devices;
wherein the one or more processors are configured to:
receive, from a server, a workflow document describing a workflow according to a workflow structure, the workflow structure describing sub-processes of the workflow, routings between the sub-processes, actions that make up the sub-processes, and mappings between data in a local working document stored in the memory and the actions, wherein the local working document is a JavaScript Object Notation (JSON) document;
identify a first sub-process of the workflow to be performed;
retrieve a first action associated with the first sub-process from the workflow document;
identify an application programming interface (API) function for performing the first action, wherein the API function is identified in the first action;
retrieve, from the workflow document, one or more first mappings between the first action and the data in the local working document;
execute, via a query module included in the memory, one or more first SQL queries on the local working document, wherein the one or more first SQL queries are specified in the one or more first mappings;
extract, from results of the one or more first SQL queries, input data for the first action;
prepare one or more parameters for the API function based on the extracted input data;
pass the one or more parameters to the API function;
execute the API function to perform one or more tasks using one or more input/output devices, wherein result data is determined based on the one or more tasks;
receive the result data from the API function;
retrieve, from the workflow document, one or more second mappings between the first action and the data in the local working document;
write, via the query module using one or more second SQL queries on the local working document, the result data into the local working document, wherein the one or more second SQL queries are specified in the one or more second mappings;
retrieve, from the workflow document, one or more first routings associated with the first sub-process, wherein each of the one or more first routings include a respective condition and a respective next sub-process, wherein the one or more first routings are ordered in a sequence;
retrieve, from the workflow document, one or more first data references to the data in the local working document, wherein the first data references are associated with the respective condition included in a first one in the sequence of the one or more first routings;
execute, via the query module, one or more third SQL queries on the local working document, wherein the one or more third SQL queries are specified in the one or more first data references;
extract, from results of the one or more third SQL queries, data associated with the respective condition included in the first one in the sequence of the one or more first routings;
evaluate the respective condition included in the first one in the sequence of the one or more first routings based on the data extracted from the results of the one or more third SQL queries;
when the respective condition included in the first one in the sequence of the one or more first routings is met, select the respective next sub-process included in the first one in the sequence of the one or more first routings as a second sub-process to be performed; and
when the respective condition included in the first one in the sequence of the one or more first routings is not met:
retrieve, from the workflow document, one or more second data references to the data in the local working document, wherein the second data references are associated with the respective condition included in a second one in the sequence of the one or more first routings;

execute, via the query module, one or more fourth SQL queries on the local working document, wherein the one or more fourth SQL queries are specified in the one or more second data references;

extract, from results of the one or more fourth SQL queries, data associated with the respective condition included in the second one in the sequence of the one or more first routings; and evaluate the respective condition included in the second one in the sequence of the one or more first routings based on the data extracted from the results of the one or more fourth SQL queries.

2. The portable computing device of claim 1, wherein the first action is performed in sequence with other actions based on a respective sequence number associated with the first action.

3. The portable computing device of claim 1, wherein:
the portable computing device is a wearable device; and
the one or more input/output devices obtain data from an environment of the portable computing device.

4. The portable computing device of claim 1, wherein the data is organized as name-value pairs in the local working document.

5. The portable computing device of claim 1, wherein the one or more first routings are ordered and evaluated in the sequence based on a respective sequence number associated with each of the one or more first routings.

6. A method comprising:
receiving, by a workflow engine of a portable computing device from a server, a workflow document describing a workflow according to a workflow structure, the workflow structure describing sub-processes of the workflow, routings between the sub-processes, actions that make up the sub-processes, and mappings between data in a local working document stored in a memory of the portable computing device and the actions, wherein the local working document is a JavaScript Object Notation (JSON) document;

identifying, by the workflow engine, a first sub-process to be performed;

retrieving, by the workflow engine, a first action associated with the first sub-process from the workflow document;

identifying, by the workflow engine, an application programming interface (API) function for performing the first action, wherein the API function is identified in the first action;

retrieving, by the workflow engine from the workflow document, one or more first mappings between the first action and the data in the local working document;

executing, by the workflow engine from the working document and via a query module included in the memory, one or more first SQL queries on the local working document, wherein the one or more first SQL queries are specified in the one or more first mappings;

extracting, by the workflow engine from results of the one or more first SQL queries, input data for the first action;

preparing, by the workflow engine, one or more parameters for the API function based on the extracted input data;

passing, by the workflow engine, the one or more parameters to the API function;

executing, by the workflow engine, the API function to perform one or more tasks using one or more input/output devices, wherein result data is determined based on the one or more tasks;

receiving, by the workflow engine, the result data from the API function;

retrieving, by the workflow engine from the workflow document, one or more second mappings between the first action and the data in the local working document;

writing, by the workflow engine and via the query module using one or more second SQL queries on the local working document, the result data into the local working document, wherein the one or more second SQL queries are specified in the one or more second mappings;

retrieving, by the workflow engine from the workflow document, one or more first routings associated with the first sub-process, wherein each of the one or more first routings include a respective condition and a respective next sub-process, wherein the one or more first routings are ordered in a sequence;

retrieving, by the workflow engine from the workflow document, one or more first data references to the data in the local working document, wherein the first data references are associated with the respective condition included in a first one in the sequence of the one or more first routings;

executing, by the workflow engine via the query module, one or more third SQL queries on the local working document, wherein the one or more third SQL queries are specified in the one or more first data references;

extracting, by the workflow engine from results of the one or more third SQL queries, data associated with the respective condition included in the first one in the sequence of the one or more first routings;

evaluating, by the workflow engine, the respective condition included in the first one in the sequence of the one or more first routings based on the data extracted from the results of the one or more third SQL queries;

when the respective condition included in the first one in the sequence of the one or more first routings is met, selecting, by the workflow engine, the respective next sub-process included in the first one in the sequence of the one or more first routings as a second sub-process to be performed; and when the respective condition included in the first one in the sequence of the one or more first routings is not met:
retrieving, by the workflow engine from the workflow document, one or more second data references to the data in the local working document, wherein the second data references are associated with the respective condition included in a second one in the sequence of the one or more first routings;

executing, by the workflow engine via the query module, one or more fourth SQL queries on the local working document, wherein the one or more fourth SQL queries are specified in the one or more second data references;

extracting, by the workflow engine from results of the one or more fourth SQL queries, data associated with the respective condition included in the second one in the sequence of the one or more first routings; and evaluating, by the workflow engine, the respective condition included in the second one in the sequence of the one or more first routings based on the data extracted from the results of the one or more fourth SQL queries.

7. The method of claim 6, wherein the first action is performed in sequence with other actions based on a respective sequence number associated with the first action.

8. The method of claim 6, wherein:
the portable computing device is a wearable computing device; and
the one or more input/output devices obtain data from an environment of the portable computing device.

9. The method of claim 6, further comprising evaluating the one or more first routings in the sequence based on a respective sequence number associated with each of the one or more first routings.

10. A non-transitory machine-readable medium comprising a plurality of machine-readable instructions which when executed by one or more processors associated with a portable computing device cause the processors to perform a method comprising:
receiving, from a server, a workflow document describing the workflow according to a workflow structure, the workflow structure describing sub-processes of the workflow, routings between the sub-processes, actions that make up the sub-processes, and mappings between data in a local working document stored in a memory of the portable computing device and the actions, wherein the local working document is a JavaScript Object Notation (JSON) document;
identifying a first sub-process to be performed;
retrieving a first action associated with the first sub-process from the workflow document;
identifying an application programming interface (API) function for performing the first action, wherein the API function is identified in the first action;
retrieving, from the workflow document, one or more first mappings between the first action and the data in the local working document;
executing, via a query module included in the memory, one or more first SQL queries on the local working document, wherein the one or more first SQL queries are specified in the one or more first mappings;
extracting, from results of the one or more first SQL queries, input data for the first action;
preparing one or more parameters for the API function based on the extracted input data;
passing the one or more parameters to the API function;
executing the API function to perform one or more tasks using one or more input/output devices, wherein result data is determined based on the one or more tasks;
receiving the result data from the API function;
retrieving, from the workflow document, one or more second mappings between the first action and the data in the local working document;
writing, via the query module using one or more second SQL queries on the local working document, the result data into the local working document, wherein the one or more second SQL queries are specified in the one or more second mappings;
retrieving, from the workflow document, one or more first routings associated with the first sub-process, wherein each of the one or more first routings include a respective condition and a respective next sub-process, wherein the one or more first routings are ordered in a sequence;
retrieving, from the workflow document, one or more first data references to the data in the local working document, wherein the first data references are associated with the respective condition included in a first one in the sequence of the one or more first routings;
executing, via the query module, one or more third SQL queries on the local working document, wherein the one or more third SQL queries are specified in the one or more first data references;
extracting, from results of the one or more third SQL queries, data associated with the respective condition included in the first one in the sequence of the one or more first routings;
evaluating the respective condition included in the first one in the sequence of the one or more first routings based on the data extracted from the results of the one or more third SQL queries;
when the respective condition included in the first one in the sequence of the one or more first routings is met, selecting the respective next sub-process included in the first one in the sequence of the one or more first routings as a second sub-process to be performed; and
when the respective condition included in the first one in the sequence of the one or more first routings is not met:
retrieving, from the workflow document, one or more second data references to the data in the local working document, wherein the second data references are associated with the respective condition included in a second one in the sequence of the one or more first routings;
executing, via the query module, one or more fourth SQL queries on the local working document, wherein the one or more fourth SQL queries are specified in the one or more second data references;
extracting, from results of the one or more fourth SQL queries, data associated with the respective condition included in the second one in the sequence of the one or more first routings; and
evaluating the respective condition included in the second one in the sequence of the one or more first routings based on the data extracted from the results of the one or more fourth SQL queries.

11. The non-transitory machine-readable medium of claim 10, wherein:
the portable computing device is a wearable computing device; and
the one or more input/output devices obtain data from an environment of the portable computing device.

* * * * *